United States Patent
Flaxmeyer et al.

(10) Patent No.: US 12,263,603 B2
(45) Date of Patent: Apr. 1, 2025

(54) LINEAR, GRIPPING, CLAMPING, ROTARY OR SWIVELING DEVICE, METHOD FOR OPERATING A DEVICE OF THIS TYPE, AND UNIT FOR EVALUATING A DEVICE OF THIS TYPE

(71) Applicant: SCHUNK GMBH & CO. KG SPANN-UND GREIFTECHNIK, Lauffen am Neckar (DE)

(72) Inventors: Florian Flaxmeyer, Heilbronn (DE); Bruno Fellhauer, Brackenheim (DE)

(73) Assignee: SCHUNK GMBH & CO. KG SPANN-UND GREIFTECHNIK, Lauffen am Neckar (DE)

( * ) Notice: Subject to any disclaimer, the term of this patent is extended or adjusted under 35 U.S.C. 154(b) by 375 days.

(21) Appl. No.: 16/605,857

(22) PCT Filed: Apr. 17, 2018

(86) PCT No.: PCT/EP2018/059741
§ 371 (c)(1),
(2) Date: Oct. 17, 2019

(87) PCT Pub. No.: WO2018/192907
PCT Pub. Date: Oct. 25, 2018

(65) Prior Publication Data
US 2020/0047345 A1   Feb. 13, 2020

(30) Foreign Application Priority Data
Apr. 19, 2017   (DE) .................... 10 2017 108 325.1

(51) Int. Cl.
*B25J 9/16*     (2006.01)
*B25J 15/00*    (2006.01)
*B25J 19/02*    (2006.01)

(52) U.S. Cl.
CPC ............. *B25J 9/1694* (2013.01); *B25J 9/161* (2013.01); *B25J 15/00* (2013.01); *B25J 19/027* (2013.01)

(58) Field of Classification Search
CPC .......... B25J 9/1694; B25J 9/161; B25J 15/00; B25J 19/027; B25J 19/02; B25J 13/087;
(Continued)

(56) References Cited

U.S. PATENT DOCUMENTS 5,401,128 A * 3/1995 Lindem ................ B23Q 1/5462
                                                    408/1 R
8,919,844 B1 * 12/2014 Mascorro ............. B25J 15/0226
                                                    294/197
(Continued)

FOREIGN PATENT DOCUMENTS

CN   101 273 688 A   10/2008
DE   10013022 A1      9/2001
(Continued)

OTHER PUBLICATIONS

Hirzinger G., et al. "Sensor-Based Space-Robotics-Rotex and Its Telerrobotic Features", IEEE Transactions on Robotics and Automation, IEEE Inc., New York, US, vol. 9, No. 5, Oct. 1, 1993, pp. 649-663, XP000422845, ISSN: 1042-296x, DOI: 10.1109/70. 258056 Figures 5, 6, 16-18, p. 9, col. 2, Line 22-Line 24.
(Continued)

*Primary Examiner* — Abby Y Lin
*Assistant Examiner* — Esvinder Singh
(74) *Attorney, Agent, or Firm* — BOND, SCHOENECK & KING, PLLC; George R. McGuire (57) ABSTRACT

The invention relates to a linear, gripping, clamping, rotary or swiveling device having a microprocessor and a basic housing (104), wherein at least two sensors are arranged on the basic housing, wherein the microprocessor is designed to
(Continued)

merge output signals of the at least two sensors to form a merged signal, and wherein the microprocessor is designed to determine an operating status of the linear, gripping, clamping, rotary or swiveling device depending on the merged signal.

5 Claims, 4 Drawing Sheets

(58) Field of Classification Search
CPC .... B25J 13/088; B25J 15/0028; B25J 9/1612; B25J 13/02; G05B 2219/39466; G05B 2219/39505
See application file for complete search history.

(56) References Cited

U.S. PATENT DOCUMENTS

| | | | | |
|---|---|---|---|---|
| 2003/0178964 | A1* | 9/2003 | Challoner | B25J 9/1694 |
| | | | | 318/568.21 |
| 2007/0075506 | A1* | 4/2007 | Gross | B23B 31/16266 |
| | | | | 279/121 |
| 2014/0278183 | A1* | 9/2014 | Zheng | G01C 25/005 |
| | | | | 702/96 |
| 2015/0019013 | A1* | 1/2015 | Rose | B25J 15/10 |
| | | | | 700/258 |
| 2016/0016309 | A1* | 1/2016 | Swift | B25J 9/0069 |
| | | | | 623/24 |
| 2016/0107316 | A1 | 4/2016 | Alt et al. | |
| 2016/0368117 | A1* | 12/2016 | Hara | B25B 5/064 |
| 2018/0079090 | A1* | 3/2018 | Koenig | A61B 34/30 |
| 2018/0117772 | A1* | 5/2018 | Ikebe | B25J 15/0028 |
| 2018/0215042 | A1* | 8/2018 | Nakayama | G01D 5/3473 |
| 2018/0354130 | A1* | 12/2018 | Preisinger | G05B 19/409 |

FOREIGN PATENT DOCUMENTS

| | | |
|---|---|---|
| DE | 102009017055 A1 | 12/2010 |
| DE | 102014210452 A1 | 12/2015 |

OTHER PUBLICATIONS

International Search Report and Written Opinion Form PCT/ISA/210 and PCT/ISA/237, International Application No. PCT/EP2018/059741, pp. 1-9, International Filing Date Apr. 17, 2018, mailing date of search report Jul. 17, 2018.

* cited by examiner

LINEAR, GRIPPING, CLAMPING, ROTARY OR SWIVELING DEVICE, METHOD FOR OPERATING A DEVICE OF THIS TYPE, AND UNIT FOR EVALUATING A DEVICE OF THIS TYPE

CROSS-REFERENCES TO RELATED APPLICATIONS

This application is a national stage application under 35 U.S.C. 371 based on international patent application PCT/EP2018/059741 filed on Apr. 17, 2018, which claims priority to German Patent Application No. 10 2017 108 325.1 filed on Apr. 19, 2017, disclosures of both of which are incorporated herein by reference in their entireties.

BACKGROUND

The invention relates to a linear, gripping, clamping, rotary or swiveling device, a method for operating a device of this type, and a unit for evaluating a device of this type.

The linear, gripping, clamping, rotary or swiveling device comprises a basic housing. In particular, at least one basic jaw that can be displaced in the basic housing is provided in a linear, gripping or clamping device. As described in DE 100 13 022 A1, two basic jaws are preferably provided which can be moved toward and away from one another by means of a wedge-hook gearing. The wedge-hook gearing can be adjusted via a piston. Gripping devices are usually used to grip objects. Clamping devices are usually used to fix objects in order to then process them. In the following, even if reference is only made to gripping or clamping, clamping and gripping is always meant thereby as well.

The rotary or swiveling device also comprises a basic housing and at least one rotary table which can rotate relative to the basic housing. A gripping or clamping device arranged on the rotary table is rotated or turned using the rotary or swiveling device, as is known for example from DE 10 2009 017 055 A1. In the following, even if reference is only made to rotating or swiveling, swiveling and rotating is always meant thereby as well.

This means that an actuator is provided, for example the basic jaw or the rotary table, which can be moved relative to the basic housing.

In the gripping or clamping device, a pneumatic drive for moving the at least one basic jaw is arranged in the basic housing. At least one gripping or clamping element is arranged on the at least one basic jaw, for example. At least one sensor for determining a current position of the at least one basic jaw or of the gripping or clamping element is arranged in the basic housing. An inductive proximity sensor, a reed switch, a magnetic switch, a flexible position sensor, an analog position sensor, or an optical distance sensor, for example, is arranged on the basic housing as a sensor for position detection. These directly or indirectly determine, for example, the position of at least one of the basic jaws. In the case of direct position detection, the at least one basic jaw switches one of the switches when an end position of its displacement path is reached, for example. In the case of indirect position measurement, a position of a part of a pneumatic drive that is movement-coupled to the at least one basic jaw is determined and the position of the at least one basic jaw is derived therefrom, for example. The stroke of a piston for displacing the at least one basic jaw is determined, for example. For this purpose, for example, a magnetic switch fastened to the basic housing is triggered in a dead center of the piston by a magnet which is fastened to the piston.

The linear, rotary or swiveling device can comprise comparable sensors.

A gripping device characterized as a linear, gripping, clamping, rotary or swiveling device is known from HIRZINGER G ET AL in IEEE TRANSACTIONS ON ROBOTICS AND AUTOMATION, 19931001 IEEE INC, NEW YORK, US, vol. 9, no. 5, pages 649-663 (XP000422845). Further devices having these features are known from CN 101 273 688 (A) and US 2016 107 316 (A1).

Depending on the required function, the sensors have to be precisely arranged on the basic housing, calibrated and taught-in. For improved operation of the gripping or clamping device, it is desirable to make the position of the at least one basic jaw, a current pressure transmitted from the at least one basic jaw onto a workpiece, a pulse generated by the pneumatic drive and acting on the at least one basic jaw or the gripping or clamping device, a current gripping cycle or a current gripping force, depending on the desired function, as precise as possible to detect without requiring major retrofitting, calibrating or teaching-in.

SUMMARY OF THE INVENTION

This is made possible by a linear, gripping, clamping, rotary or swiveling device comprising a microprocessor and a basic housing, it being possible to detachably arrange a linear, gripping, clamping, rotary or swiveling element on the basic housing, and at least two sensors being arranged on the basic housing, wherein the microprocessor is designed to merge output signals of the at least two sensors to form a merged signal and to identify information about an identification of the linear, gripping, clamping, rotary or swiveling device or of the linear, gripping, clamping, rotary or swiveling element depending on the merged signal.

The microprocessor is preferably designed to determine an operating status of the linear, gripping, clamping, rotary or swiveling device depending on the merged signal.

An operating status relates, for example, to one or more of the following functions:
- detecting a current position of the gripping or clamping element in the space,
- detecting a current location of a gripper formed by the gripping element: open, closed, gripping,
- detecting a new gripping or clamping element,
- self-teaching,
- detecting a current displacement region for the at least one basic jaw,
- estimating force,
- detecting collisions,
- estimating remaining service life duration,
- optimizing cycle time,
- detecting an end position,
- combined query for detecting or distinguishing magnetic fields of adjacent gripping or clamping elements,
- detecting a current force in order to avoid damage,
- detecting sensor signals for a big data application,
- merging sensor signals in order to exploit redundancy for improved robustness or self-diagnostics,
- transmitting sensor signals as a smart device.

The microprocessor is preferably designed to determine a displacement position of an actuator, in particular at least one basic jaw displaceably arranged on the basic housing, or a rotary position of at least one rotary table rotatably arranged on the basic housing, depending on the merged signal. As a result, the operating status, for example open, closed, gripping or clamping, is detected.

A magnetic field sensor, an acceleration sensor and/or a gyro sensor are preferably arranged on the basic housing, the microprocessor being designed to calibrate the magnetic field sensor, the acceleration sensor or the gyro sensor depending on the merged signal. The device is therefore self-teaching with respect to these sensors and thus plug-and-work capable.

A linear, gripping, clamping, rotary or swiveling element can preferably be detachably arranged on the basic housing, the microprocessor being designed to identify information about an identification of the linear, gripping, clamping, rotary or swiveling device or of the linear, gripping, clamping, rotary or swiveling element depending on the merged signal. For example, an acceleration signal, in particular a pulse, is evaluated, which signal is detected by the acceleration sensor when the at least one basic jaw is displaced to a stop which limits a displacement path of the at least one basic jaw. The stop is arranged on the basic housing, for example. It is also possible to evaluate a pulse that is produced when two basic jaws that have moved toward one another meet. It is also possible to evaluate a pulse that is produced when at least one basic jaw and one workpiece meet. The pulse of different gripping or clamping devices differs depending on the gripping or clamping device or depending on the gripping or clamping element. The pulse can be used for identification. It is possible to reliably detect manipulation on the gripping or clamping device or a non-system gripping or clamping element in the gripping or clamping device.

A signal of an end effector which detects when at least one basic jaw is displaced to the stop can also be evaluated. In a rotary table, an end effector can also fix the displacement of the rotary table to a stop.

The microprocessor is preferably designed to calibrate the linear, gripping, clamping, rotary or swiveling element depending on the information about the identification. This allows, for example, self-calibration depending on a type of the gripping or clamping element.

A magnet which can be displaced relative to the basic housing is advantageously arranged on the basic housing, a current position of the magnet relative to the basic housing depending on the operating status of the gripping or clamping device, and the microprocessor being designed to determine information about the operating status depending on a detected current position of the magnet relative to the basic housing. The magnet is, for example, movement-coupled to the least one basic jaw or to a piston which drives the at least one basic jaw. The magnetic field sensor is arranged, for example, at a dead center of the piston movement or at one end of the displacement path of the at least one basic jaw. An operating status in which the gripping or clamping element is open or closed is then detected, for example, when the magnetic field sensor detects or does not detect the magnetic field of the magnet. A first operating status is detected, for example, when a magnetic field having a field strength which exceeds a threshold value is detected. A second operating state is detected, for example, when a detected magnetic field strength is equal to the threshold value or below the threshold value.

The magnetic field sensor is advantageously designed to detect information about a current magnetic field strength, the microprocessor being designed to determine the information about the current location of the linear, gripping, clamping, rotary or swiveling device depending on the detected current magnetic field strength. As a result, it is possible to detect a location on the basis of a change in direction of the detected magnetic field, for example. The geomagnetic field is superimposed on the magnetic field generated by the magnet. Depending on the location of the magnetic field sensor, the geomagnetic field has a different direction with respect to the magnetic poles of the Earth. The magnetic field sensor is immovable relative to the gripping or clamping device. Depending on the detected direction of the geomagnetic field, the location of the linear, gripping, clamping, rotary or swiveling device can thus be determined.

A transmitting apparatus and/or a receiving apparatus is preferably arranged in the basic housing, which apparatus is designed for wired or wireless transmission of information, the microprocessor being designed to transmit information about the operating status, information about the merged signal or information about the identification via the transmitting apparatus, and/or the microprocessor being designed to receive information about a functionality of the linear, gripping, clamping, rotary or swiveling device via the receiving apparatus, and to configure the operating status depending on the information about the functionality. For this purpose, for example, an external apparatus is connected via an IO-Link, an active Near Field Communication (NFC) connection, or Bluetooth.

The invention also relates to a method for operating and a unit for evaluating the operating status of the in particular gripping or clamping device.

Further details and advantageous embodiments of the invention can be found in the following description, with reference to which embodiments of the invention will be described and explained in greater detail.

DETAILED DESCRIPTION

Figure 1:
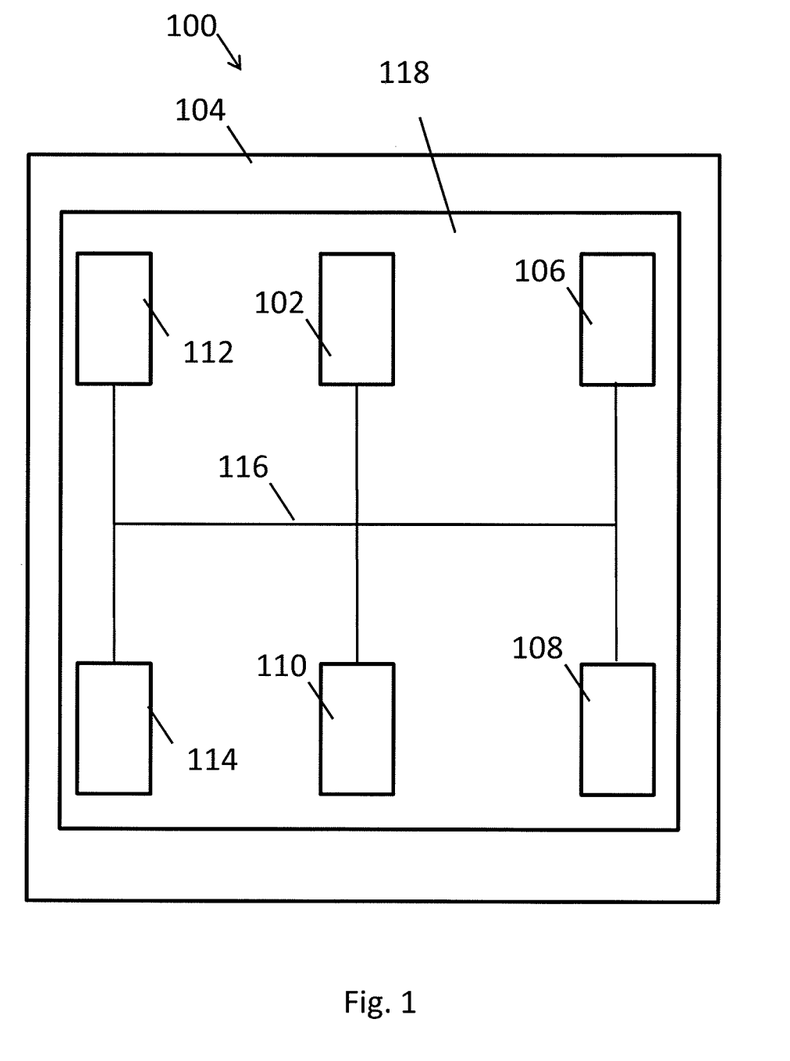
FIG. 1 is a schematic view of a linear, gripping, clamping, rotary or swiveling device.

FIG. 1 schematically shows a gripping or clamping device 100 comprising a microprocessor 102 and a basic housing 104, wherein a magnetic field sensor 106, an acceleration sensor 108 and a gyro sensor 110 are arranged on the basic housing 104. Other sensors, for example the sensors described below, can also be arranged on the basic housing 104. The function will be described in the following on the basis of this example. Application in a linear, rotary or swiveling device is also possible.

A transmitting apparatus 112 and a receiving apparatus 114 are arranged on the basic housing 104, which apparatuses are designed for wired or wireless transmission of information. These can also be provided as a transceiver in a component. These are designed, for example, to provide an IO-Link, an active Near Field Communication (NFC) connection or a Bluetooth connection for data transmission.

A data bus 116 connects the microprocessor 102 to the magnetic field sensor 106, the acceleration sensor 108, the gyro sensor 110, the transmitting apparatus 112 and the receiving apparatus 114. These elements are preferably arranged on a circuit board 118.

The magnetic field sensor 106 is preferably a 3D magnetic field sensor. The magnetic field sensor 106 is designed to detect information about a current magnetic field strength.

The acceleration sensor 108 is preferably a 3D acceleration sensor. The magnetic field sensor 106, the acceleration sensor 108 or the gyro sensor 110 is provided as a microelectromechanical sensor, i.e. as a MEMS sensor. The components can also be integrated in a microchip.

Figure 2:
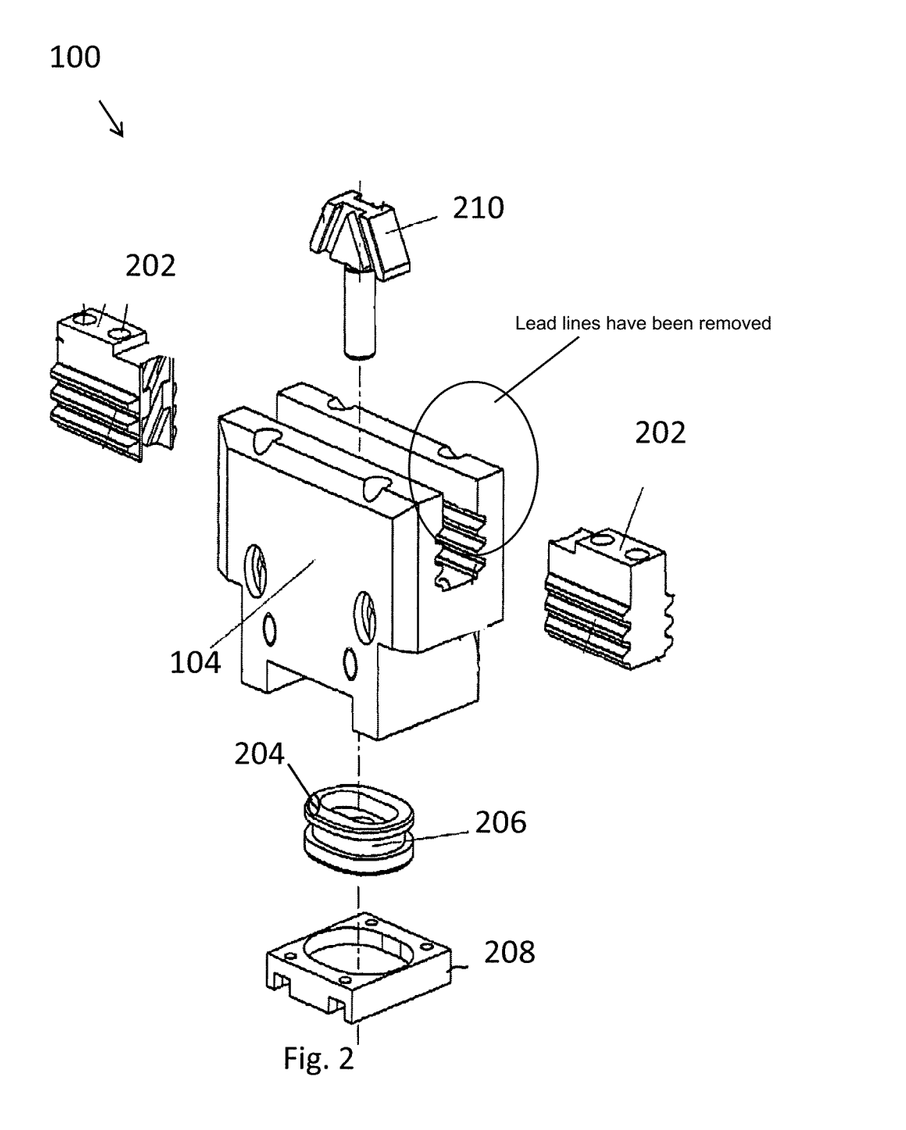
FIG. 2 is a perspective view of parts of a gripping or clamping device.

The linear, gripping, clamping, rotary or swiveling device 100 and a method and a unit for evaluating or adjusting an operating status of the linear, gripping, clamping, rotary or swiveling device 100 are described in the following with reference to FIGS. 1 and 2 using the example of the gripping and clamping device 100. In the drawings, the elements which have the same function are provided with the same reference numeral.

At least one basic jaw 202 is displaceably arranged on the basic housing 104.

A magnet 204 which can be displaced relative to the basic housing 104 is arranged on the basic housing 104. In the example, the magnet 204 is arranged on a piston 206. Instead of the magnet 204, a soft magnetic piston can also be used. In this case, an excitation magnet is stationarily arranged on the basic housing 104 such that a magnetic field generated by the excitation magnet is changed by the soft magnetic piston depending on the current position of the soft magnetic piston. The magnet 204 can also be arranged in the basic housing 104 so as to be immovable with respect to the basic housing 104. In this case, the magnetic field sensor 106 is arranged on the piston 206 so as to be displaceable relative to the basic housing 104.

The piston 206 is movably arranged in the basic housing 104 in a cylinder 208. The piston 206 in this case cooperates with a wedge-hook gearing 210 in order to displace two basic jaws 202, as described in DE 100 13 022 A1. As a result, a position of the magnet 204 relative to the basic housing 104 can be assigned a unique position of the at least one basic jaw 202 in its displacement path. More specifically, a current position of the magnet 204 relative to the basic housing 104 depends on the operating status of the gripping or clamping device 100.

In the rotary or swiveling device, for example, instead of the basic jaws 202, a rotary table is positioned by means of an actuator which can be adjusted by means of a pneumatic drive. The position of the magnet 204 is assigned in this case, for example, a position of the rotary table.

The microprocessor 102 is designed to detect output signals from the magnetic field sensor 106, the acceleration sensor 108 and/or the gyro sensor 110. The microprocessor 102 is designed to merge at least two output signals to form a merged signal. This will be described in the following.

The microprocessor 102 is designed to determine an operating status of the gripping or clamping device 100 depending on the merged signal.

The microprocessor 102 is designed, for example, to determine a displacement position of the at least one basic jaw 202 depending on the merged signal.

The microprocessor 102 is designed, for example, to determine information about the operating status depending on a detected current position of the magnet 204 relative to the basic housing 104.

The microprocessor 102 is alternatively or additionally designed to determine information about the current location of the gripping or clamping device 100 depending on the detected current magnetic field strength.

A gripping or clamping element can be arranged on the at least one basic jaw 202. The microprocessor 102 can alternatively or additionally be designed to determine information about an identification of the gripping or clamping device or of the gripping or clamping element depending on the merged signal. The microprocessor 102 can alternatively or additionally be designed to calibrate the gripping or clamping element depending on the information about the identification.

The microprocessor 102 is designed, for example, to transmit information about the operating status, information about the merged signal or information about the identification via the transmitting apparatus 112.

The microprocessor 102 is additionally or alternatively designed to receive information about a functionality of the gripping or clamping device via the receiving apparatus 114, and to configure the operating status depending on the information about the functionality.

The microprocessor 102 is preferably designed to calibrate the magnetic field sensor 106, the acceleration sensor 108 or the gyro sensor 110 depending on the merged signal.

Figure 3:
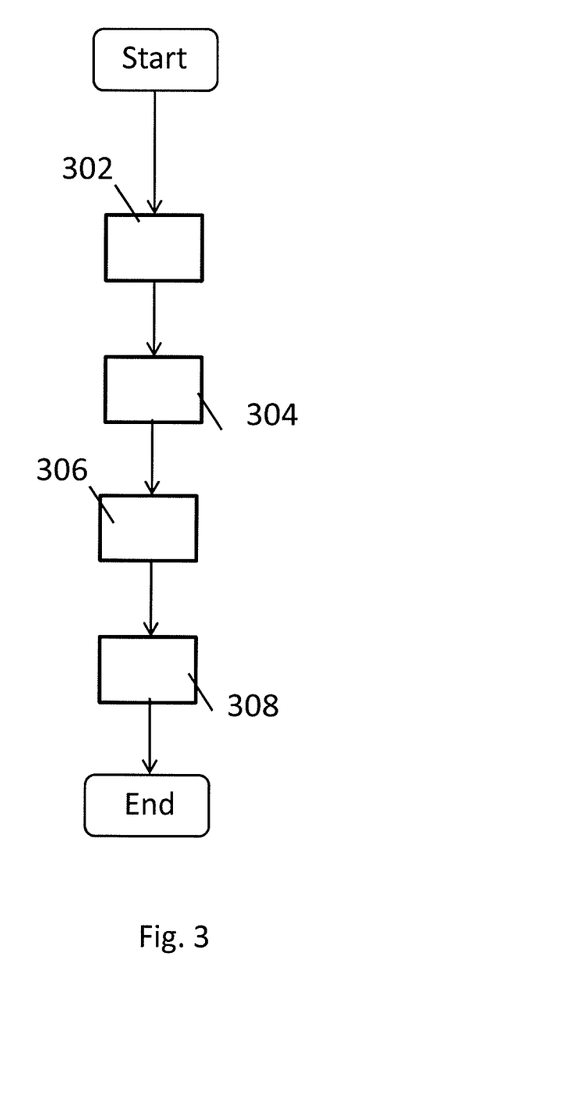
FIG. 3 shows a method for merging sensor data and evaluating an operating status of the linear, gripping, clamping, rotary or swiveling device.

A method for evaluating an operating status of the linear, gripping, clamping, rotary or swiveling device 100 will be described with reference to FIG. 3. The method is carried out, for example, during operation of the linear, gripping, clamping, rotating or swiveling device 100.

After starting, in a first step 302, at least two output signals are merged for example by the magnetic field sensor 106, the acceleration sensor 108 and/or the gyro sensor 110. This generates the merged signal. This step includes detecting the output signals, for example, or previously detected output signals are accessed.

In a second step 304, the operating status of the linear, gripping, clamping, rotary or swiveling device 100 is determined depending on the merged signal.

For example, the displacement position of at least one of the basic jaws 202 is determined depending on the merged signal. Alternatively or additionally, the magnetic field sensor 106, the acceleration sensor 108 or the gyro sensor 110 is calibrated depending on the merged signal. Alternatively or additionally, information about the identification of the gripping or clamping device or about the gripping or clamping element which is arranged on the basic jaw 100 is identified depending on the merged signal. Alternatively or additionally, the linear, gripping, clamping, rotary or swiveling element is calibrated depending on the information about the identification. Alternatively or additionally, a current position of the magnet 204 is detected, information about the operating status being determined depending on the detected current position of the magnet 204 relative to the basic housing 104. Alternatively or additionally, information about the current magnetic field strength is detected, information about the current location of the gripping or clamping device 100 being determined depending on the detected current magnetic field strength.

In an alternative or additional third step 306, information about the operating status, information about the merged signal or information about the identification is transmitted in a wired or wireless manner.

In an alternative or additional fourth step 308, information about a functionality of the gripping or clamping device is received in a wired or wireless manner, and the operating status is configured depending on the information about the functionality.

The method subsequently ends.

These steps can be carried out and/or repeated in this order or in a different order.

Figure 4:
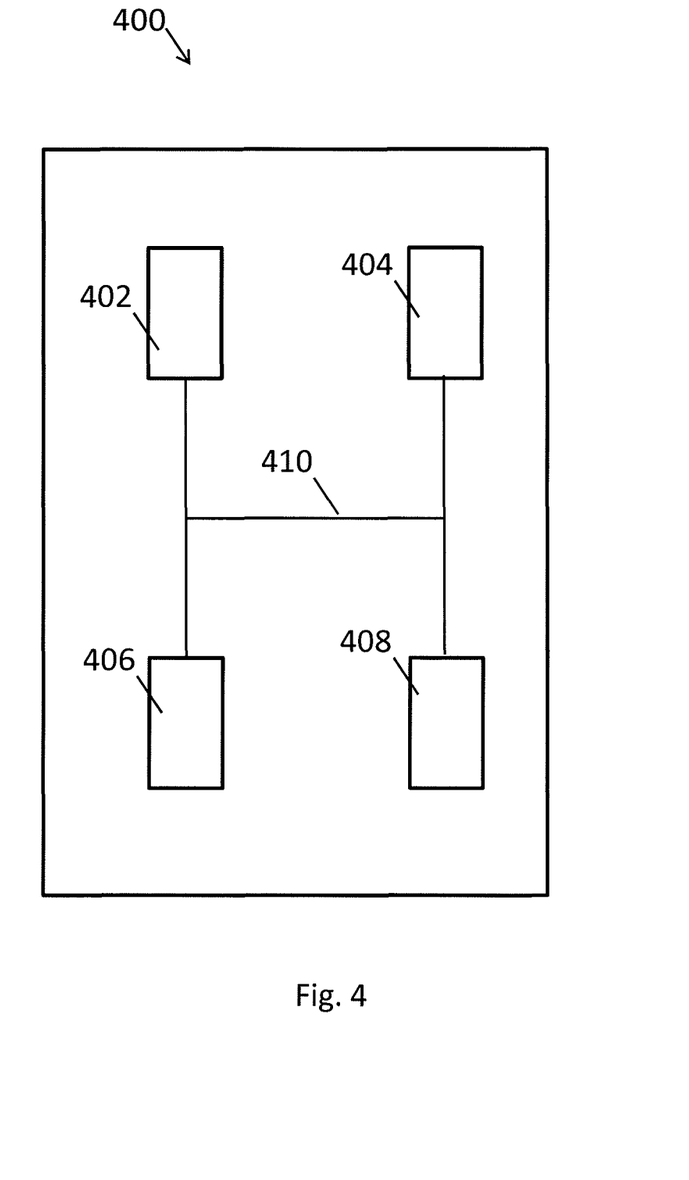
FIG. 4 shows a unit for evaluating or adjusting an operating status of a linear, gripping, clamping, rotary or swiveling device.

A unit 400 for evaluating or adjusting an operating status of the linear, gripping, clamping, rotary or swiveling device 100 will be described with reference to FIG. 4. The unit 400 is designed to receive information about an operating status, information about the merged signal or information about the identification of the linear, gripping, clamping, rotary or swiveling device 100 in a wired or wireless manner. The unit 400 comprises a receiver 402 which is compatible with the transmitting apparatus 112. More precisely, the receiver is designed to transmit the data via the IO-Link, NFC or Bluetooth.

The unit 400 is preferably designed to transmit information about the functionality of the gripping or clamping device 100 in a wired or wireless manner in order to configure the operating status of the linear, gripping, clamping, rotary or swiveling device 100 depending on the information about the functionality. The unit 400 comprises a transmitter 404 which is compatible with the receiving apparatus 114. More precisely, the transmitter is designed to transmit the data via the IO-Link, NFC or Bluetooth.

The unit 400 also comprises a computer unit 406 and a human-machine interface 408 which are connected to the receiver 406 via a bus 410 and designed to cooperate in order to display the received data relating to the information about an operating status, information about the merged signal or information about the identification of the linear, gripping, clamping, rotary or swiveling device 100 for an operator.

The computer unit 406 and the human-machine interface 408 are connected to the transmitter 404 via the bus 410 and are preferably designed to cooperate in order to generate the data relating to the functionality to be adjusted of the linear, gripping, clamping, rotary or swiveling device 100 depending on a user input of the operator and to transmit said data via the transmitter 404.

The unit 400 is, for example, a mobile device, in particular a smart phone or a tablet or laptop computer which communicates with the linear, gripping, clamping, rotary or swiveling device 100 as a smart device. Data transmission to a server or from a server can also be provided, which server can be connected via the Internet.

In summary, the functions specified in the following table are provided, for example. An "X" in column A means that the function from the row in which the "X" is entered uses a geomagnetic field sensor, for example. An "X" in column B means that the function from the row in which the "X" is entered uses a sensor for a built-in magnet 204, for example. An "X" in column C means that the function from the row in which the "X" is entered uses an acceleration sensor, for example. An "X" in column D means that the function from the row in which the "X" is entered uses a gyro sensor, for example. An "X" in column E means that the function from the row in which the "X" is entered uses prior knowledge about the end effector, for example. An "X" in column F means that the function from the row in which the "X" is entered uses the microprocessor, for example.

| Function | A | B | C | D | E | F |
|---|---|---|---|---|---|---|
| Position in the space for joining tasks | X |  | X | X |  | X |
| High-resolution finger position (analog or digital) and additionally the assignment to 'OPEN,' 'CLOSED' and 'gripped' | X | X |  | X | X | X |
| Plug-and-Work (self-teaching sensors) |  | X | X |  |  | X |
| Gripper region output |  | X | X |  | X | X |
| Force estimation via pulse evaluation and prior knowledge about the component |  | X | X |  | X | X |
| Collision detection |  | X | X |  | X | X |
| Remaining service life duration estimation and thus the possibility for "pay for grip" and "second live" |  | X | X | X | X | X |
| Cycle time optimization since the end position and its quality are detected faster |  | X | X |  |  | X |
| Combined query of a plurality of partial movements by detecting and distinguishing the magnetic fields of adjacent modules | X | X | X | X | X | X |
| Detection or possibility of avoiding damage to the gripped component by measuring the pulses and assignment to exceedance of the values allowed by the workpiece. |  |  | X |  | X | X |
| Basis for BIG DATA | X | X | X | X |  |  |
| Basis for Functional Safety (FuSa) functionalities by means of redundant information generation | X | X | X | X | X | X |
| Reduction of cabling, since only one line leaves the gripper, whereas previously at least 2 lines for the above functions even more lines were required |  | X | X | X | X | X |
| Smart device capability: the module automatically detects a change in the process data and can thus independently set a maintenance order. |  | X | X | X | X | X |

In order to merge sensors in the linear, gripping, clamping, rotary or swiveling device 100, two or more of the sensor data are used in this case. This means that, on the linear, gripping, clamping, rotary or swiveling device 100 comprising the microprocessor 102 and the basic housing 104, at least two sensors, i.e. for example the magnetic field sensor 106, the acceleration sensor 108 and/or the gyro sensor 110, are arranged on the basic housing 104.

The microprocessor 102 is designed to merge output signals of the at least two sensors to form a merged signal. In this case, output signals denote analog or digital electrical signals which transmit or contain information about a measured value, i.e. output data, of the relevant sensor. The microprocessor 102 is designed to determine an operating status of the linear, gripping, clamping, rotary or swiveling device 100 depending on the merged signal. In addition to the output signals of the magnetic field sensor 106, the acceleration sensor 108 and/or the gyro sensor 110, the output signals of the sensors indicated in the table can additionally or alternatively be merged.

In this case, the linking of the output data of a plurality of sensors is referred to as the merging of precise sensor data fusion. The sensor data merged for a specific function are marked with "X" in a row of the table for the relevant function. The aim is to obtain information that depends on the function specified in the function column.

Linking output data from a plurality of sensors which detect the same operating status increases accuracy and reduces measurement errors when the sensors are not correlated.

For example, classification methods, stochastic methods, Kalman filters, fuzzy logic, logic operations or rules-based methods can also be used for linking.

What is claimed is:

1. Linear, gripping, or clamping device comprising a microprocessor, a basic housing, a linear, gripping, or clamping element detachably arranged on the basic housing, and at least two different sensor types arranged on the basic housing, wherein the at least two different sensor types are chosen from
   a geomagnetic field sensor;
   a gyro sensor, and
   a magnetic field sensor sensing the position of a magnet and configured to detect information about a current magnetic field strength, wherein the microprocessor is configured to determine information about the current location of the linear, gripping, or clamping device depending on the detected current magnetic field strength,
wherein the microprocessor is configured to simultaneously merge output signals of the at least two different sensor types to form a merged signal and to identify information about an identification of the linear, gripping, or clamping device or of the linear, gripping, or clamping element depending on the merged signal,
wherein the microprocessor is configured to determine, depending on the merged signal, a rotary position of at least one rotary table rotatably arranged on the basic housing,
wherein the microprocessor is configured to determine an operating status of the linear, gripping, or clamping device depending on the merged signal, and
wherein the linear, gripping, or clamping device further comprises:
a magnet arranged on the basic housing which can be displaced relative to the basic housing, a current position of the magnet relative to the basic housing depending on the operating status of the linear, gripping, or clamping device, and the microprocessor is further configured to determine information about the operating status depending on a detected current position of the magnet relative to the basic housing,
the microprocessor is further configured to calibrate the magnetic field sensor or the gyro sensor depending on the merged signal.

2. Linear, gripping, or clamping device according to claim 1, wherein the microprocessor is configured to determine, depending on the merged signal, a displacement position between a pair of basic jaws displaceably arranged on the basic housing.

3. Linear, gripping or clamping device according to claim 1, further comprising a transmitting apparatus and/or a receiving apparatus arranged on the basic housing, the apparatus is configured for wired or wireless transmission of information, the microprocessor being further configured to transmit information about the operating status, information about the merged signal or information about the identification via the transmitting apparatus, and/or the microprocessor being configured to receive information about a functionality of the linear, gripping, or clamping device via the receiving apparatus, and to configure the operating status depending on the information about the functionality.

4. Unit for evaluating or adjusting an operating status of a linear, gripping, or clamping device, wherein the linear, gripping, or clamping device comprises a microprocessor and a basic housing, a linear, gripping, or clamping element detachably arranged on the basic housing, and at least two different sensor types arranged on the basic housing, wherein the at least two different sensor types are chosen from
   a geomagnetic field sensor;
   a gyro sensor, and
   a magnetic field sensor sensing the position of the magnet and configured to detect information about a current magnetic field strength, wherein the microprocessor is configured to determine information about the current location of the linear, gripping, or clamping device depending on the detected current magnetic field strength,
wherein the microprocessor is configured to simultaneously merge output signals of the at least two different sensor types selected from to form a merged signal and to identify information about an identification of the linear, gripping, or clamping device or of the linear, gripping, or clamping element depending on the merged signal,
wherein the microprocessor is configured to determine, depending on the merged signal, a rotary position of at least one rotary table rotatably arranged on the basic housing,
wherein the unit is configured to receive information about an operating status, information about the merged signal or information about the identification of the linear, gripping, or clamping device in a wired or wireless manner, and/or the unit being configured to transmit information about a functionality of the linear, gripping, or clamping device in a wired or wireless manner in order to configure the operating status of the linear, gripping, or clamping device depending on the information about the functionality,
wherein the microprocessor is configured to determine an operating status of the linear, gripping, or clamping device depending on the merged signal, and
wherein the unit further comprises:
a magnet arranged on the basic housing which can be displaced relative to the basic housing, a current position of the magnet relative to the basic housing depending on the operating status of the linear, gripping, or clamping device, and the microprocessor is further configured to determine information about the operating status depending on a detected current position of the magnet relative to the basic housing,
the microprocessor is further configured to calibrate the magnetic field sensor or the gyro sensor depending on the merged signal.

5. Linear, gripping, or clamping device comprising a microprocessor, a basic housing, a linear, gripping, or clamping element detachably arranged on the basic housing, and at least two different sensor types arranged on the basic housing, wherein the two different sensor types are chosen from:
   a geomagnetic field sensor;
   a magnetic field sensor sensing the position of a magnet; and
   an acceleration sensor,
wherein the microprocessor is configured to simultaneously merge output signals of the at least two different sensor types to form a merged signal and to identify information about an identification of the linear, gripping, or clamping device or of the linear, gripping, or clamping element depending on the merged signal,
wherein the microprocessor is configured to determine, depending on the merged signal, a rotary position of at least one rotary table rotatably arranged on the basic housing,
wherein the microprocessor is configured to determine an operating status of the linear, gripping, or clamping device depending on the merged signal, and
wherein the linear, gripping, or clamping device further comprises:
a magnet arranged on the basic housing which can be displaced relative to the basic housing, a current position of the magnet relative to the basic housing depending on the operating status of the linear, gripping, or clamping device, and the microprocessor is further configured to determine information about the operating status depending on a detected current position of the magnet relative to the basic housing,
the microprocessor is further configured to calibrate the magnetic field sensor or the acceleration sensor depending on the merged signal.

* * * * *